April 25, 1967     H. J. WURGLER ETAL     3,315,699
AIR VALVE
Filed Oct. 9, 1963     2 Sheets-Sheet 1
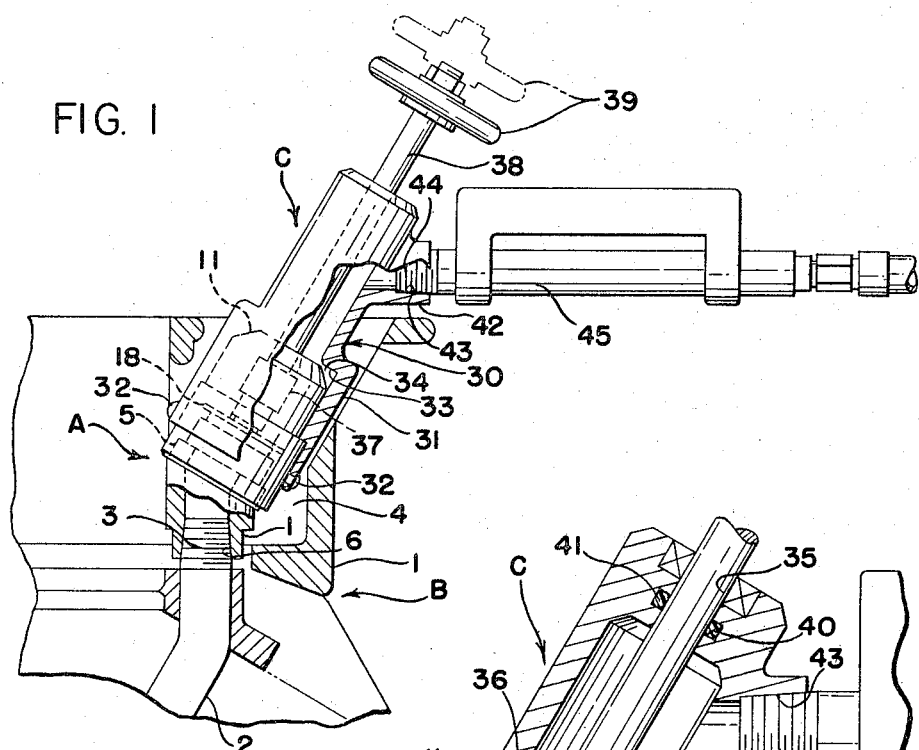
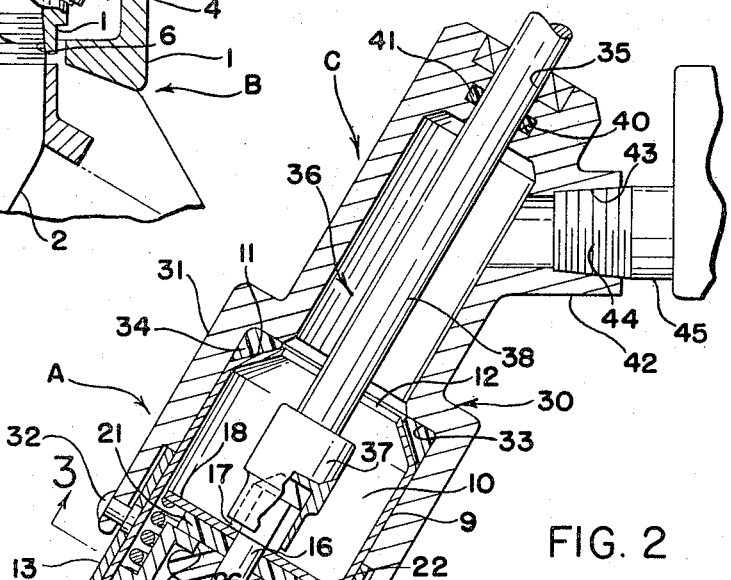
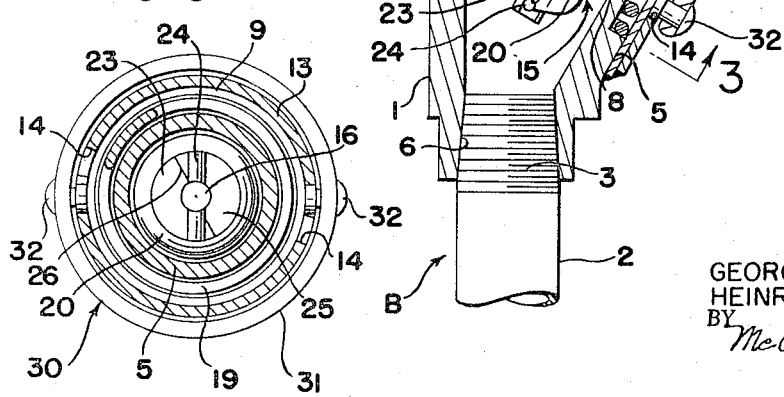
INVENTORS.
GEORGE W. STAMBAUGH &
HEINRICH J. WURGLER
BY McCoy, Greene, Medert,
& TeGrotenhuis
ATTORNEYS

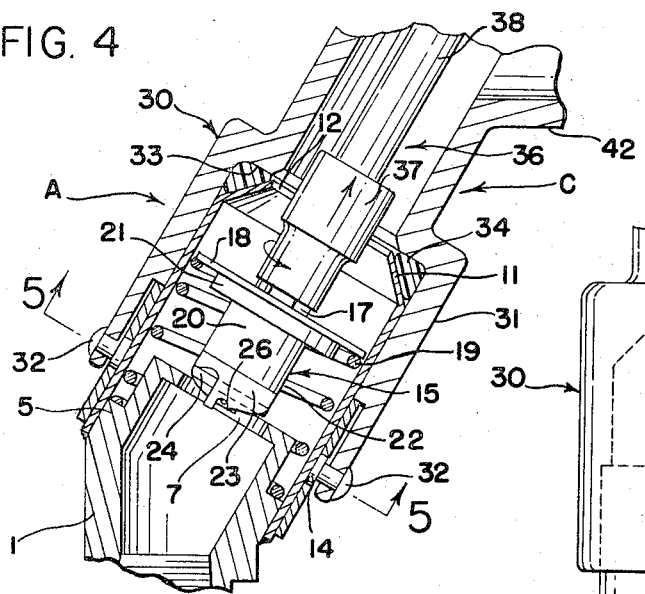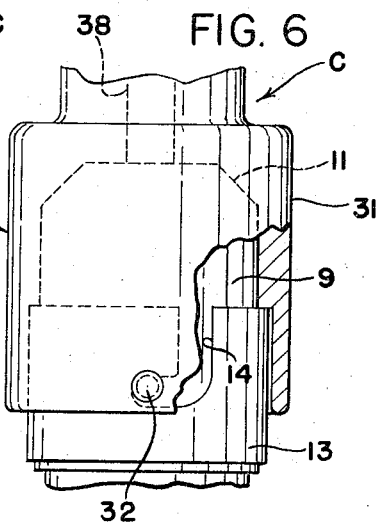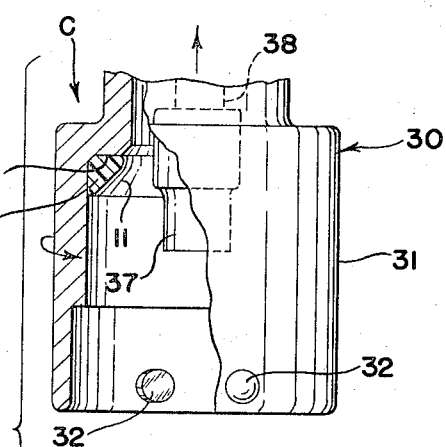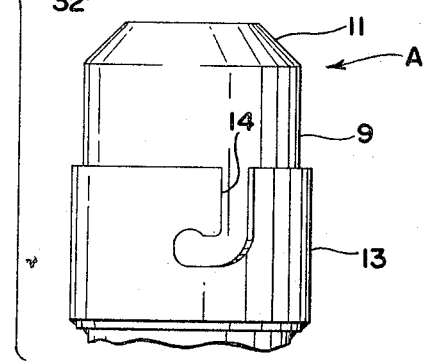

United States Patent Office 3,315,699
Patented Apr. 25, 1967

3,315,699
AIR VALVE
Heinrich J. Wurgler, Alliance, and George W. Stambaugh, Akron, Ohio, assignors to The General Tire & Rubber Company, Akron, Ohio, a corporation of Ohio
Filed Oct. 9, 1963, Ser. No. 314,973
3 Claims. (Cl. 137—321)

The present invention relates to a sealing valve and more particularly to a fluid-tight valve that is operable to retain fluid under pressure in or to release pressure from pressurized chambers.

The invention is particularly adapted for pneumatic systems in which it is desirable that compressed air or other gas at a desired pressure be retained and in which it is desirable that the pressure be readily released when desired. In pneumatic systems which require that pressures above or at the atmospheric level be maintained for long periods of time, it is particularly desirable to provide a leak-proof valve which will not be subject to accidental displacement from either its pressure retaining or pressure venting position.

The present invention provides a sealing valve and pressure fitting which combine to form a novel means for pressurizing and sealing a pneumatic system. The pressure fitting is adapted to telescopically fit over the sealing valve and provide a sealed air passage from a pressurizing system through the fitting and into the pneumatic system. The fitting also includes means for closing the valve while the fitting is still attached.

The valve of the present invention utilizes a cylindrical elastic sealing element adapted for insertion into a circular valve opening and is provided with means for subjecting the sealing element to axial compression to expand it radially outwardly into engagement with the surrounding wall of the valve opening and tightly lock the element in sealing condition in the opening. Upon releasing the squeezing force, the sealing element returns to its normal form and may be easily withdrawn from the valve opening to permit the passage of fluid therethrough.

The sealing element is rotatably and slidably mounted on a supporting shaft or pin together with a cam-operated means for applying axial pressure to the sealing element. By turning the shaft the cam means may be operated to longitudinally squeeze the sealing element and radially expand it into its sealing condition.

This construction provides a novel positive sealing and venting valve which is not susceptible to accidental release from either its sealing or venting position and which may be conveniently mounted in a pressure chamber inlet fitting to cut off the pressure supply and seal the chamber when desired.

It is an object of the present invention to provide a sealing and venting valve for fluid-pressure systems which provides an effective leak-proof seal and which is of simple design and low cost construction.

Other objects and advantages will be apparent from the accompanying description and drawings forming a part of this specification in which:

FIGURE 1 is a front elevation with parts broken away of a sealing valve and pressure fitting embodying the present invention;

FIGURE 2 is a longitudinal central section of the sealing valve and pressure fitting shown in FIGURE 1, showing the valve in closed position and shown substantially to scale;

FIGURE 3 is a transverse sectional view of the sealing valve and pressure fitting shown in FIGURE 1 and taken along the line 3—3 of FIGURE 2;

FIGURE 4 is a fragmentary longitudinal central section on an enlarged scale of the sealing valve and pressure fitting shown in FIGURE 1, showing the valve in open position;

FIGURE 5 is a fragmentary transverse sectional view of the sealing valve and pressure fitting shown in FIGURE 1 and taken along the line 5—5 of FIGURE 4;

FIGURE 6 is a fragmentary side elevation on an enlarged scale of the sealing valve and pressure fitting showing the fitting in its locked pressure supplying position relative to the valve;

FIGURE 7 is a side elevation on an enlarged scale of the sealing valve and pressure fitting with parts broken away, showing the head of the fitting disengaged from the valve.

Referring more particularly to the drawings, there is shown a manually operable sealing valve embodying the present invention, located in a pneumatic system wherein the valve is used with a detachable pressure supply fitting and is operable to close the inlet port while the pressure fitting is connected to provide a seal after removal of the fitting and to vent the system to the atmosphere when desired.

As shown in the drawings, a valve assembly A is mounted on an apparatus B which includes a frame 1, and a tube 2 which leads and forms part of an enclosed chamber that is to be pressurized. The tube 2 has a threaded end portion 3 which extends upwardly into a protective chamber 4 in the frame 1 within which the valve assembly A is mounted.

The valve assembly A includes a base member 5 fixed to the frame 1 in the lower portion of the chamber 4 which has a threaded opening 6 at its lower end for receiving the threaded end 3 of the tube 2. The base 5 also has a circular opening 7 above the opening 6 formed by a circular inturned flange portion 8 which provides a valve seat. The opening 7 provides a passage for introducing fluid under pressure to the tube 2 through which pressure may be supplied to or exhausted from a pressurized chamber.

Mounted on the base 5 and surrounding the opening 7 is a cylindrical wall 9 which extends upwardly from the base 5 and forms a cylindrical chamber 10. The wall 9 is fitted to the base 5 to provide a tight seal, and has an inwardly coned circular flange 11 at its end opposite the base 5 which forms a circular opening 12. Attached to the lower end portion of the wall 9 is a cylindrical sleeve 13 which has two J-shaped slots 14 on opposite sides thereof for detachably securing a pressure supplying device to the valve as will be hereinafter described.

Mounted within the chamber 10 is a movable valve unit 15 which is adapted to seal the opening 7 when the valve is closed. The valve unit 15 includes a central shaft or stem 16 having a hexagonal head 17 at its outer end, adapted to be received in a hexagonal socket of the proper size. Mounted on the shaft 16 adjacent the head 17 is a flat circular washer 18 that is engaged by a coil spring 19 which bears at its inner end against the base 5 as shown in FIGURES 2 and 4 and which is arranged to bias the valve unit 15 to the valve open position as shown in FIGURE 4.

Mounted on the shaft 16 inwardly of the washer 18 is an elastic sleeve 20 preferably formed of an elastic sealing material such as rubber. The sleeve 20 has an outwardly flanged end portion 21 which bears against the washer 18 and a narrower cylindrical portion 22 of a proper size to pass with small clearance through the opening 7. At the end of the shaft 16 adjacent the inner end of the sleeve 20 is a cam member 23 mounted for rotary movement with the sleeve 20 relative to the shaft 16. The cam member 23 is retained on the shaft 16, by a pin 24 extending transversely through the shaft 16 and engaging camming surfaces 25 on the inner face of the cam member 23. The camming surfaces 25 have a helicoidal form whereby turning the hexagonal head 17 clockwise moves the pin 24 angularly relative to the cam member 23 and causes axial movement of the cam member 23 on the shaft 16 to longitudinally squeeze the sleeve 20 and expand it into sealing engagement with the wall of the opening 9 and the interior of the flange 8 as shown in FIGURE 2. The cam member 23 has a slot 26 adapted to receive and retain the pin 24 when it has been moved to its valve closing position.

Thus, when the valve stem assembly is pressed downwardly against the resisting force of the spring 19 so that the shaft 16 carries the cam member 23 and a portion of the sleeve 20 through the circular opening 7, the shaft 16 may be turned clockwise to force the cam member 23 upward and longitudinally squeeze the sleeve 20 to cause the elastic material to bulge radially outward against the wall of the circular opening 7 and against the flange 8 below the opening 7 tightly lock the valve stem assembly 15 in the opening 7 as shown in FIGURE 2.

While the valve may be released by any hexagonal socket of the proper size to fit the hexagonal head 17, a special detachable pressure fitting C has been designed for use with the valve assembly to facilitate delivery of fluid to the apparatus. The fitting C comprises a housing 30 having a head 31 adapted to telescopically fit over the cylindrical wall 9 and sleeve 13 of the valve assembly A as shown in FIGURE 2. Near the open end of the head 31 are two locking rivets 32 passing through the wall of the head 31 and extending slightly inwardly. The rivets 32 are adapted to fit into the J-shaped slots 14 when the head 31 is placed over the valve assembly A and thus guide the head 31 to detachably lock the fitting C to the valve assembly A by a bayonet connection as shown in FIGURE 6.

The housing 30 has an annular shoulder portion 33 at the outer end of the head 31 that presses an annular sealing ring 34 preferably formed of an elastic material such as rubber against the conical flange 11 of the wall 9 when the head 31 is placed over the valve assembly A as shown in FIGURES 2 and 4 to provide an air-tight seal.

Slidably and rotatably mounted in a circular opening 35 in the outer end of the housing 30 is a valve actuating tool 36 that is provided with a hexagonal socket 37 which is adapted to engage the head 17 of the shaft 15. The socket 37 is on the inner end of a longitudinal shaft 38 which is slidably received in the opening 35 and which is provided with an operating handle 39 exteriorly of the housing 30. The circular opening 35 has an annular groove 40 which receives a circular sealing ring 41 which provides an air-tight seal between the shaft 38 and the housing 30.

The housing 30 has a laterally projecting cylindrical inlet 42 which is provided with a threaded opening 43. The threaded opening 43 receives the threaded end portion 44 of a tube 45 extending from a pressure line which supplies fluid under pressure suitable for the apparatus being pressurized.

When the fitting C is locked in position over the valve assembly A, the housing 30 provides an air passage from the tube 45 into the cylindrical chamber 10. Thus when the valve unit 15 is in its upward valve open position, pressurized fluid may be introduced into a pneumatic system through the opening 7. Then, when the desired pressure is obtained, the socket 37 of the valve actuating tool 36 may be placed over the head 17 of the shaft 16 and pressed downwardly using the handle 39, until the flanged end portion 21 of the sleeve 20 bears against the base 5 adjacent the edges of the circular opening 7. The handle is then turned to lock the valve unit 15 in the opening 7 to seal the pressurized fluid in the pneumatic system.

It will be understood that the above description is by way of illustration rather than limitation and that variations and modifications of the specific device herein shown and described may be made without departing from the spirit of the invention.

What we claim is:

1. In combination, a valve for sealing fluid under pressure in an enclosed chamber, said valve having a housing comprising a base (5) and an outwardly projecting peripheral wall (9) with an intermediate portion (8) of reduced diameter below the upper portion (11) of said peripheral wall and spaced inwardly from said peripheral wall, said valve having an axially movable valve unit in said housing comprising an upright central shaft (16) with an upper tool-receiving portion (17), a tubular elastic sealing member (20) having an internal surface shaped to fit the external surface of said shaft and slidably mounted on said shaft below said tool-receiving portion, radially extending means (18) on the upper end of said shaft for limiting upward axial movement of said tubular sealing member, a coil spring (19) mounted on said base in a position surrounding said intermediate portion (8) of reduced diameter and disposed between said base and said radially extending means (18) to bias said sealing member upwardly from a lower position within said portion of reduced diameter to an upper open position within said peripheral wall above said portion of reduced diameter and below the upper portion (11) of said peripheral wall, a cam member (23) slidably and rotatably mounted on said shaft below and adjacent said sealing member, and means (24) on the lower portion of said shaft engageable with said cam member for moving said cam member axially upwardly to bulge said sealing member radially outwardly in response to turning of said tool-receiving portion, whereby rotation of said tool-receiving portion is effective to bulge said sealing member radially outwardly into sealing engagement with said portion of reduced diameter to seal said chamber, detent means (26) for locking said valve unit in its sealing position, and locking means (32) for detachably connecting a pressure fitting (C) to said valve to hold said fitting in sealing engagement with the upper portion of said peripheral wall.

2. A combination as defined in claim 1 wherein said intermediate portion of said base has a circular inturned flange portion (8) which provides a valve seat, and said tubular sealing member (2) has an outwardly flanged portion (21) at the upper end thereof which bears against said radially extending means (18) and engages said valve seat when the sealing member is in its lowermost position.

3. A combination as defined in claim 1 wherein said peripheral wall (9) has an inwardly turned circular flange (11) at its upper end with an internal diameter less than that of said spring and said radially extending means (18), and said pressure fitting (C) comprises a housing having an annular head (31) shaped to fit over said peripheral wall (9), said head having an annular sealing ring (34) with a tapered internal surface for engaging said circular flange to prevent escape of fluid from said passage as it is supplied under pressure through said valve to said chamber.

References Cited by the Examiner

UNITED STATES PATENTS

| 2,479,862 | 8/1949 | Payne | 215—53 |
| 2,802,492 | 8/1957 | Gosselin | 141—346 X |
| 3,010,694 | 11/1961 | Lynch | 251—189 |
| 3,151,650 | 10/1964 | Beck | 200—24.5 X |

FOREIGN PATENTS

| 1,041,397 | 5/1953 | France. |

LAVERNE D. GEIGER, *Primary Examiner.*

E. J. EARLS, *Assistant Examiner.*